(12) United States Patent
Schindler

(10) Patent No.: US 8,368,738 B2
(45) Date of Patent: Feb. 5, 2013

(54) JOINING USERS TO A CONFERENCING SESSION

(75) Inventor: Christopher Schindler, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1391 days.

(21) Appl. No.: 12/014,075

(22) Filed: Jan. 14, 2008

(65) Prior Publication Data

US 2009/0179983 A1 Jul. 16, 2009

(51) Int. Cl.
*H04R 7/14* (2006.01)

(52) U.S. Cl. .................. 348/14.08; 348/14.01

(58) Field of Classification Search .... 348/14.01–14.16; 370/260–271; 379/201.01, 202.01; 709/204
See application file for complete search history.

(56) References Cited

U.S. PATENT DOCUMENTS

| | | | |
|---|---|---|---|
| 6,272,214 B1 * | 8/2001 | Jonsson | 379/202.01 |
| 6,564,261 B1 | 5/2003 | Gudjonsson et al. | |
| 7,177,905 B1 | 2/2007 | Slutsman et al. | |
| 2005/0018826 A1 * | 1/2005 | Benco et al. | 379/202.01 |
| 2006/0147009 A1 * | 7/2006 | Greenlee et al. | 379/202.01 |
| 2006/0233120 A1 | 10/2006 | Eshel et al. | |
| 2007/0002779 A1 | 1/2007 | Lee et al. | |
| 2007/0050448 A1 | 3/2007 | Gonen et al. | |
| 2007/0162553 A1 | 7/2007 | Dewing et al. | |
| 2007/0203980 A1 | 8/2007 | Andersen | |

OTHER PUBLICATIONS

"GoToMeeting", 1997-2007 Citrix Online, LLC.
"Run Microsoft Office Live Meeting Web Access", 2007 Microsoft Corporation.
"IMConferencing", 2007 LiveOffice LLC.
"Web Conferencing Services", 2006 ConferenceCall.com.

* cited by examiner

*Primary Examiner* — Brian Ensey

(57) ABSTRACT

Architecture for combining an outbound contact via multiple communications modes and the joining of an invitee to a communications session (e.g., conference call, web conference, etc.) without requiring substantial authentication of the invitee, if at all. The invitee can be automatically connected to the session using the communication method of choice, for example, conference call session or web conferencing session. An invitation can be sent to the invitee through multiple communication channels such as phone, text messaging, SMS, MMS, and email. The architecture facilitates the automatic creation of meeting resources (conference call session or web conferencing session). The meeting (or session) organizer can be treated as an invitee and be contacted by an application to request join in the meeting resource. Moreover, the ability is provided to mix audio/video of meeting resources. The invitee and/or the organizer can have an interactive conversation with the invitee-join application using the communication modes. The invitee-join application can parse and understand invitee responses.

20 Claims, 14 Drawing Sheets

JOINING USERS TO A CONFERENCING SESSION

BACKGROUND

The value of a meeting is having all invitees participating in the meeting so that issues can be discussed, decisions made, and status communicated. Meeting invitees may not be able to attend a meeting in-person or a meeting organizer may not be aware of the best method for a user to join a meeting. Today, when an invitee cannot attend the meeting using typical means such as attending in-person or via other normally used means, the invitee must arrange other resources such as conference calls or web conferencing with the meeting organizer (or representative) prior to meeting. This preparation can consume an inordinate amount of time and generate a negative user experience, especially when occurring immediately before the meeting thereby introducing inefficiencies for both the organizer and the invitee(s). Invitees want the flexibility of choosing how to connect to a meeting and that the connection setup to be easy and seamless.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture enables an invitee to a communications session to easily connect to a meeting using one or more of available communications technologies. Enhanced notifications facilitate the contact of an invitee prior to a meeting using a phone, text messaging, email, or SMS (short message service), for example. The invitee has the option to connect to the scheduled meeting immediately without having scheduled conference call or web conference resources.

The architecture unifies multiple disparate communication methods to make it easy for a session invitee to connect to a meeting, regardless of the current communication channel. The invitee is automatically connected to the meeting using the most appropriate communications channel for the meeting. If a meeting resource does not exist (e.g., multimedia conference), the meeting resource is created for the invitee. When the invitee creates the meeting resource for a communications mode, the invitee is joined to the session and the meeting organizer is contacted to bring the organizer into the session using the same meeting channel (if desired).

To the accomplishment of the foregoing and related ends, certain illustrative aspects are described herein in connection with the following description and the annexed drawings. These aspects are indicative, however, of but a few of the various ways in which the principles disclosed herein can be employed and is intended to include all such aspects and equivalents. Other advantages and novel features will become apparent from the following detailed description when considered in conjunction with the drawings.

DETAILED DESCRIPTION

Figure 1:
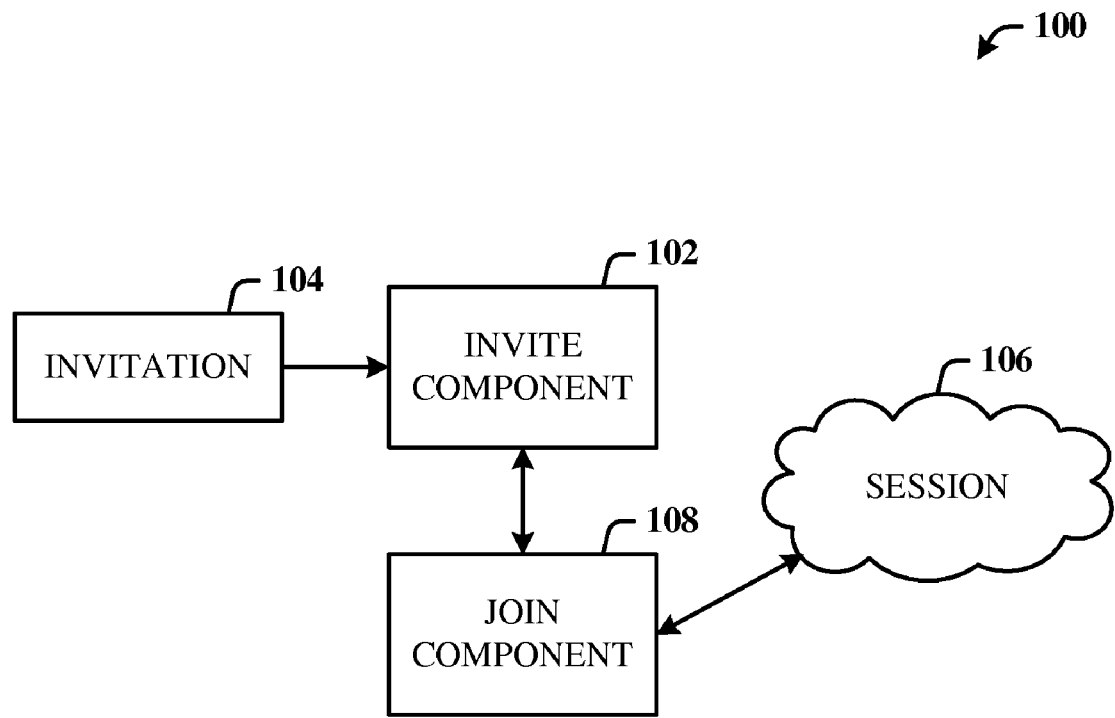
FIG. 1 illustrates a computer-implemented communications system for joining meeting invitees to a conferencing session.

The disclosed architecture provides the capability to combine an outbound contact via multiple communications modes and the joining of an invitee to a communications session without requiring substantial authentication of the invitee. The user can be requested to enter a PIN code when receiving a phone call. For other modes, because the message is sent to an authenticated and authorized endpoint, it is assumed that the user is valid. This communications session includes web conferencing, video conferencing and other conferencing channels that are based on computer or telephony networking protocols, but not exclusively delivered over HTTP (hypertext transfer protocol) or using features common in web conferencing such as whiteboards, document sharing, etc.

An invitee can be automatically connected to the session using the communication method of choice, for example, conference call session or web conferencing session. An invitation can be sent through multiple communication channels such as phone (e.g., landline, cell, IP), text messaging, SMS (short message service), MMS (multimedia message service), and email. The architecture facilitates the automatic creation of meeting resources (conference call session or web conferencing session). The meeting (or session) organizer can be contacted by an application to request join in the meeting resource. Moreover, the ability is provided to mix audio/video content and/or data channels of meeting resources. For example, web conferencing can employ audio, video and content (e.g., the sharing documents). The invitee and/or the organizer can have an interactive conversation (or dialog) with the invitee-join application using the communication modes. The invitee-join application can parse and understand invitee responses.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof.

FIG. 1 illustrates a computer-implemented communications system 100 for joining meeting invitees to a conferencing session. The system 100 includes an invite component 102 for receiving an invitation 104 for an invitee to participate in a communications session 106, and a join component 108 for automatically joining the invitee into the communications session 106 in response to the invitation 104.

The communications session 106 can be established prior to the invitation and the invitee is automatically joined into the session 106 using a communications mode associated with the session 106. Alternatively, the join component 108 can automatically establish the communications session 106 in response to receiving the invitation 104, and other invitees and/or the organizer can join the communications session 106 using a client and communications mode associated with the session 106. The other invitees are notified of the communications session 106 prior to joining the communications session 106. Note that the invitee can also be the organizer. If the session is initiated by a user other than the organizer, for example, a user invited by the organizer, the organizer has not yet joined. Thus, the client application can automatically initiate communications to the organizer, who then also becomes an invitee.

The communications session 106 can be a conference call session that is associated with voice communications, or a web conference session that is associated with video conferencing. The invitee can receive the invitation 104 to the communications session 106 via a communications mode that includes text messaging, voice phone call, email, SMS, and/or MMS, for example, and connects to the session 106 according to the associated conferencing method. For example, assume that the organizer has a conference call scheduled and set-up. It is possible that an invitee may join using a web conferencing method, which includes audio from a conference call. Another example is when an organizer is hosting a web conference and an invitee listens to the audio over a conference call method.

Alternatively or in combination therewith, the invitation can be manually initiated. For example, the invitation can be initiated by selecting a soft button presented by a client or other appointment/invite storage mechanism. In other words, rather than receiving a triggered notification, a user can simply select the button to trigger the invite component 102.

Figure 2:
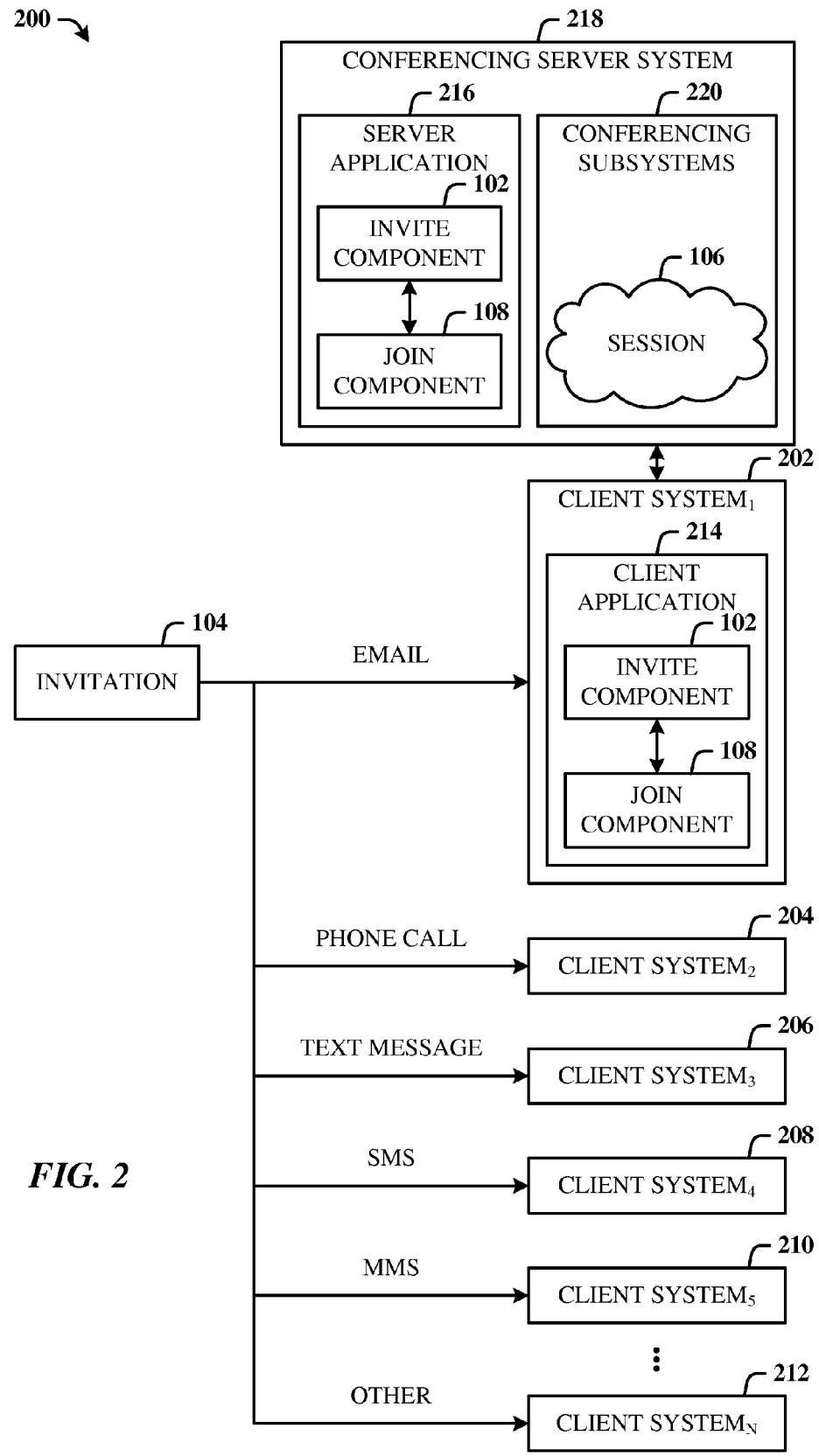
FIG. 2 illustrates a system that employs multiple communications modes via which the invitation can be communicated to an invitee.

FIG. 2 illustrates a system 200 that employs multiple communications modes via which the invitation can be communicated to an invitee. An invitee can be associated with a plurality of different types of communications devices and systems. For example, a first client system 202 can be a mobile communications device (e.g., cell phone, smart phone, mobile-capable PDA, etc.), desktop computer, or portable computer that receives an email message that conveys the invitation 104 to the invitee. A second system or device 204 can be a cell phone that receives the invitation 104 via an interactive voice response (IVR) system. A third system or device 206 can be a VoIP (voice-over-IP) phone for VoIP communications not only for voice communications but also digital information such as a text message. A fourth device or system 208 can be a message centric device such as a PDA that can communicate SMS (short message service) messages. A fifth device or system 210 can communicate MMS (multimedia message service) communications such as via a smartphone. Other devices or systems 212 can include office phones, hotel phones when the invitee is on travel, and so on.

The join component 108 can provide functionality that presents multiple invitations received to the invitee, and allows the invitee to review and select from the multiple invitations to join into one or more sessions. In other words, although the typical experience is to join into a single session, it can be possible for the invitee to join into multiple different sessions at the same time.

It is also within contemplation of the disclosed architecture that the multiple possible communications methods which can be used to contact an invitee and/or by which an invitee communicates to the session can be managed. For example, in a corporate environment, it may be desirable (e.g., for legal reasons) to limit or control what sessions can be accessed by video or audio. An administrator can configure one or more polices that automatically execute to impose controls that, for example, restrict a conferencing session of User A to conference call (audio only). The policies can also be imposed based on the subject matter or anticipated content of the session. For example, if a video conference was scheduled for a discussion about medical subject matter, the policy could limit the conference to audio only to limit the presentation of photographs, etc., that depict the condition of a patient. In yet another example, policies can be imposed to restrict who can be an organizer, the timeframe and duration for conducting the session, and so on. These are just a few examples of the flexibility provided by the join architecture.

The invite component 102 and the join component 108 can be embodied as a single client application 214 installable on the client system 202 and/or the other client systems (204, 206, 208, 210 and 212) to provide the invitee-join functionality described herein.

Alternatively, or in combination therewith, the invite component 102 and the join component 108 can be embodied as a server application 216 on a conferencing system 218. The conference session 106 can be created and maintained via conferencing subsystems 220. The server system 218 can operate to automatically initiate a predetermined number of retries over one or more of the communications channels that can be utilized to reach an invitee. The same number of retries can be imposed on all channels or a different number of retires can be implemented for each channel or groups of channels. This can be user configurable by the organizer and uploaded to the server 218 and/or imposed by policy, for example.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
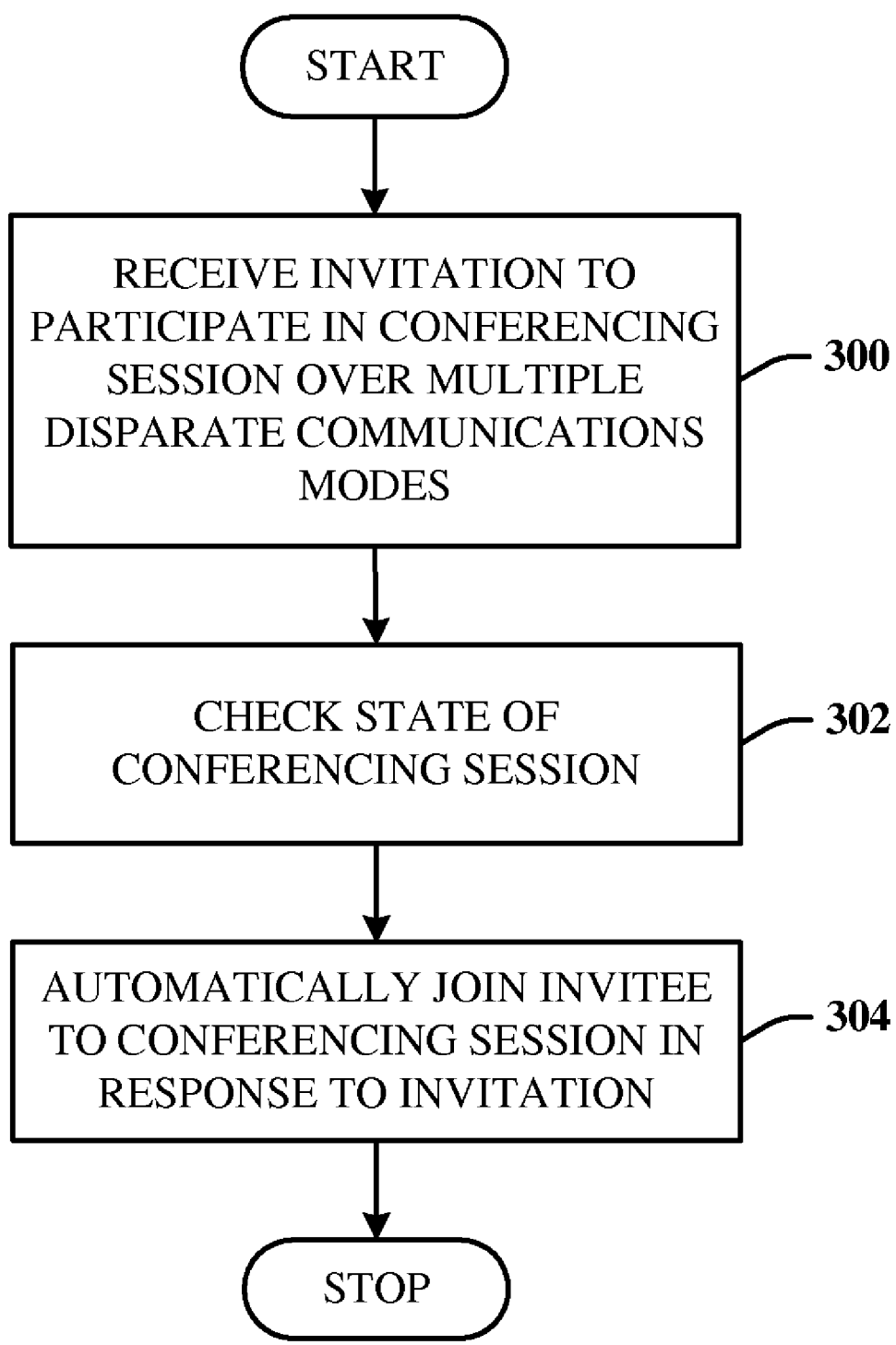
FIG. 3 illustrates a method of managing a communications session.

FIG. 3 illustrates a method of managing a communications session. At 300, an invitation to participate in a conferencing session is received over multiple disparate communications modes. At 302, state of the conferencing session is checked. At 304, an invitee is automatically joined into the conferencing session in response to the invitation.

Figure 4:
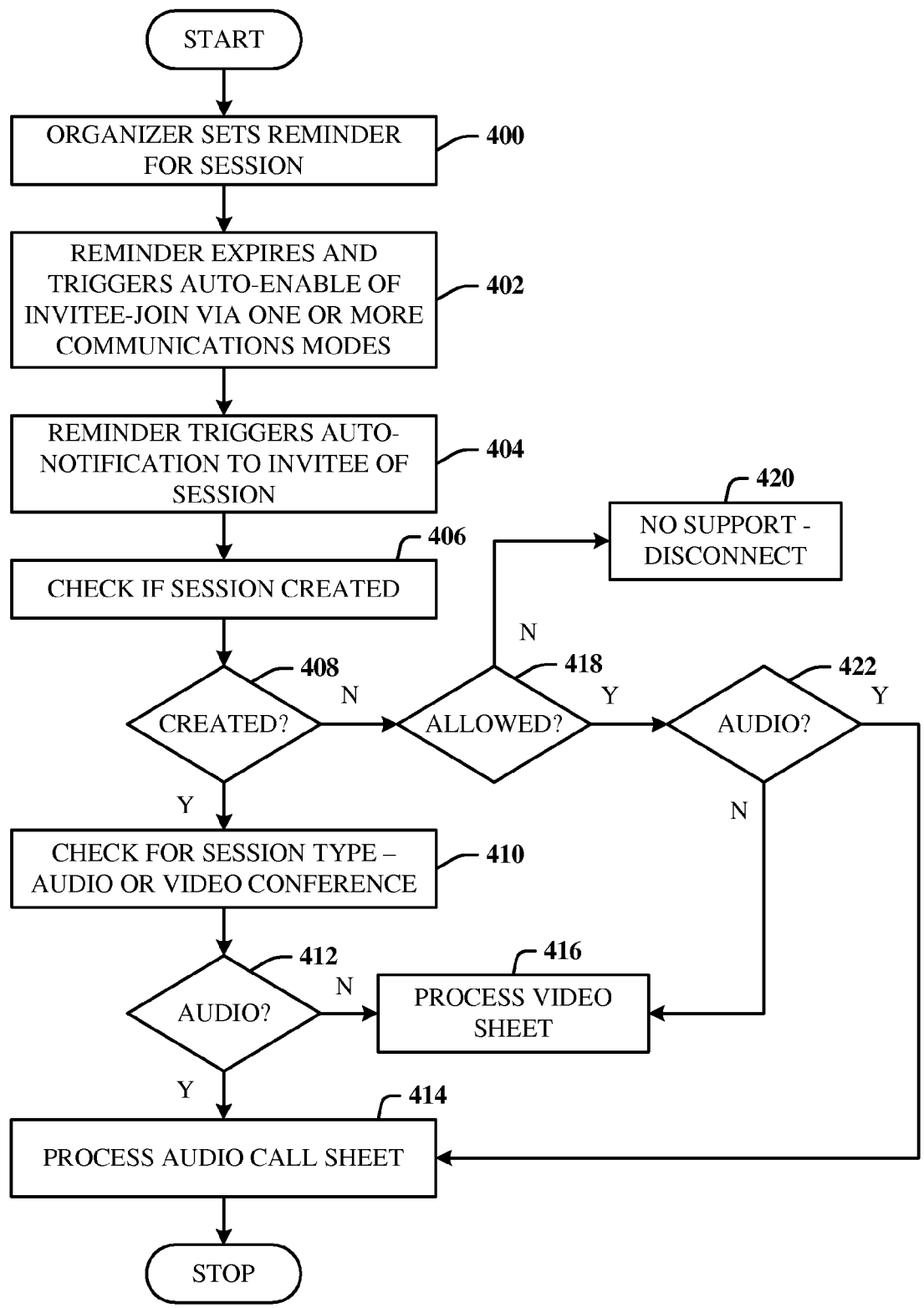
FIG. 4 illustrates a method of inviting an invitee to a communications session.

FIG. 4 illustrates a method of inviting an invitee to a communications session. Generally, an invitation is offered to the invitee by any available notification system (e.g., email, phone, test messaging, etc.). The invitee-join functionality is made by the invite component (e.g., that includes a notification application) to the invitee. Once the invitee-join functionality has been offered to the invitee, invitee-join functionality checks to see if the session resources (e.g., audio conference, web conference) already exist. If not, the invitee join functionality prompts the invitee for the preferred connection to the session. Once selected and allowed, the session is created in response to the invitee selection. Configuration of the session resources can be pre-configured by an administrator, which can also be the session organizer.

More specifically, at 400, a session organizer can set a reminder in commonly-used reminder applications as to the start of the session. At 402, when the reminder expires, this triggers automatic enablement of the invitee join functionality for the session across many different communications means that the intended invitee may be using. In other words, if the invitee will be called on a cell phone, the invitee-join functionality can be enabled via an interactive voice recorder message such that the invitee is then able to make selections via the cell phone for creating the session and/or entering an existing session.

At 404, the reminder can also trigger the invitee join functionality to automatically send the invite to the invitee using one or more communications modes, including, but not limited to, text messaging, interactive phone call (e.g., recorded message, live voice from organizer, etc.), email, SMS, MMS, and other well-known and user-friendly means for communicating using a wide variety of devices and systems. In essence, this is similar to a broadcast of the invitation to the invitee by all means available. The means by which the invitee is contacted can also be more selective based on an invitee user profile, location of the invitee at the approximate time of the invitation, type of device or system that is likely to be in use or near the invitee at the time of the invite, and so on. The means can also be prioritized, if desired, such that the invitee will be contacted by the quickest communications (e.g., cell phone) means for accessing the invitee before slower means (e.g., email).

At 406, a check is made to determine if the session has already been created. If so, at 408, flow is to 410 to check for the type of session (e.g., audio, video, etc.). At 412, if audio (e.g., conference call session), flow is to 414 to then process a call sheet. Alternatively, if the session is to an audio session, as determined at 412, flow is to 416 to process a video conferencing sheet.

At 408, if the session has not yet been created (or established), flow is to 418, to determine if the invitee is allowed to create the session. The determination can be processed using policies or rules. For example, given that it is known that the session will be conducted, the organizer or other designated user can prepare an authorized list of participants against which invitees who seek to create the session must be on the list or be associated with other identifying information that can be checked to ensure only authorized users will be allowed to create the session. The rules or policies can be based on a higher-level of information such as employee status, as well. In another example, the session participants can include third-party invitees that can obtain access to the session information without authentication when the invitation is transmitted. The invitation will include all the information needed to enter and/or establish the session. If not allowed, flow is from 418 to 420 to disconnect the invitee. The invitee can be provided alternative means for contacting the organizer, for example, to resolve the disconnect. It is also possible that the device or system via which the invitee attempted to create the session is unsupported.

At 418, if the invitee is allowed to create the session, flow is to 422 to prompt the invitee for the type of session as audio conference or video conference. If audio is selected, flow is to 414 to process the audio call sheet. If audio is not selected, flow is from 422 to 416 to process the video sheet. The session can then terminate when the invitees, now participants, leave the session.

Figure 5:
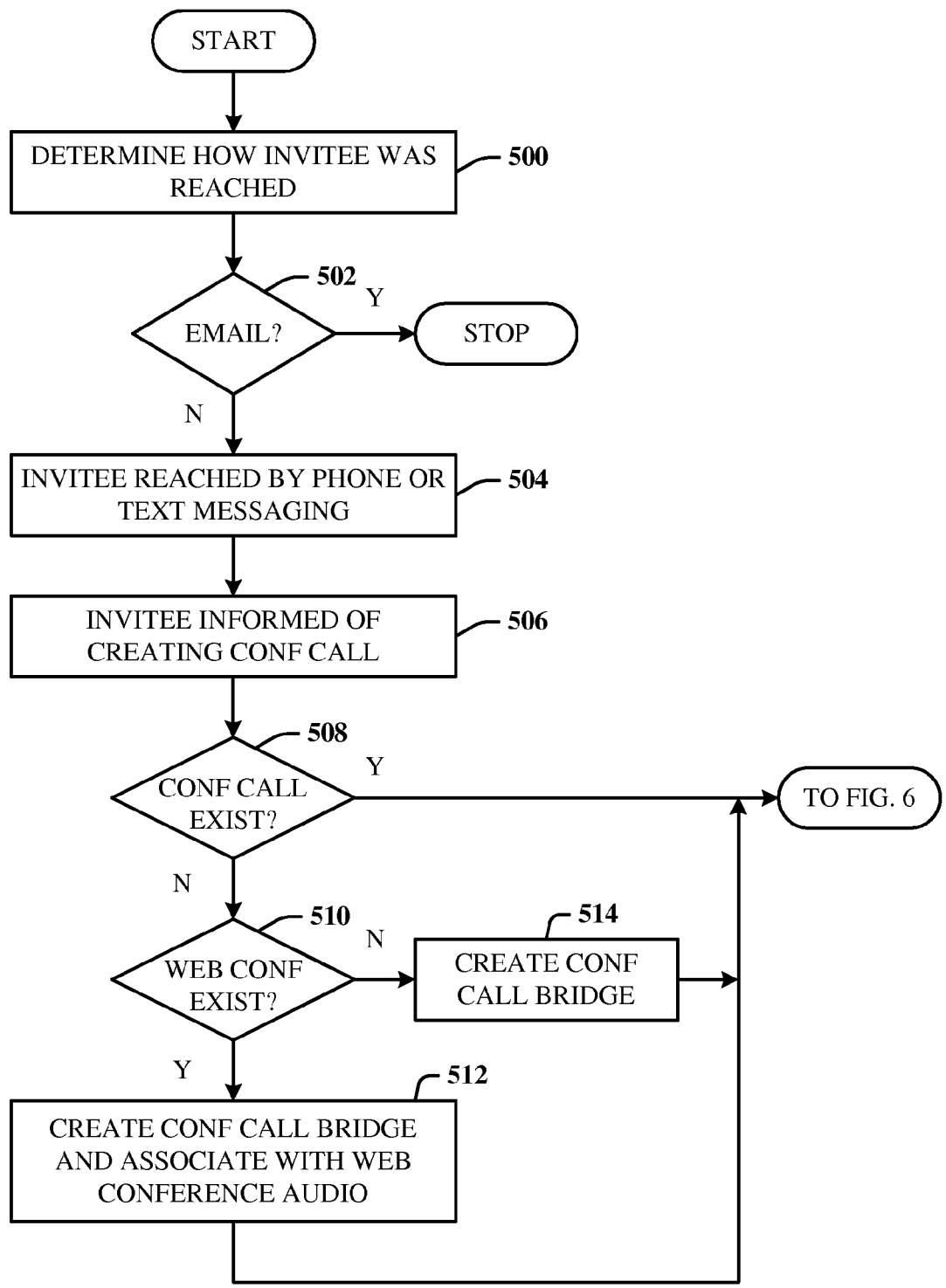
FIG. 5 illustrates a method of inviting an invitee to a conference call session.
Figure 6:
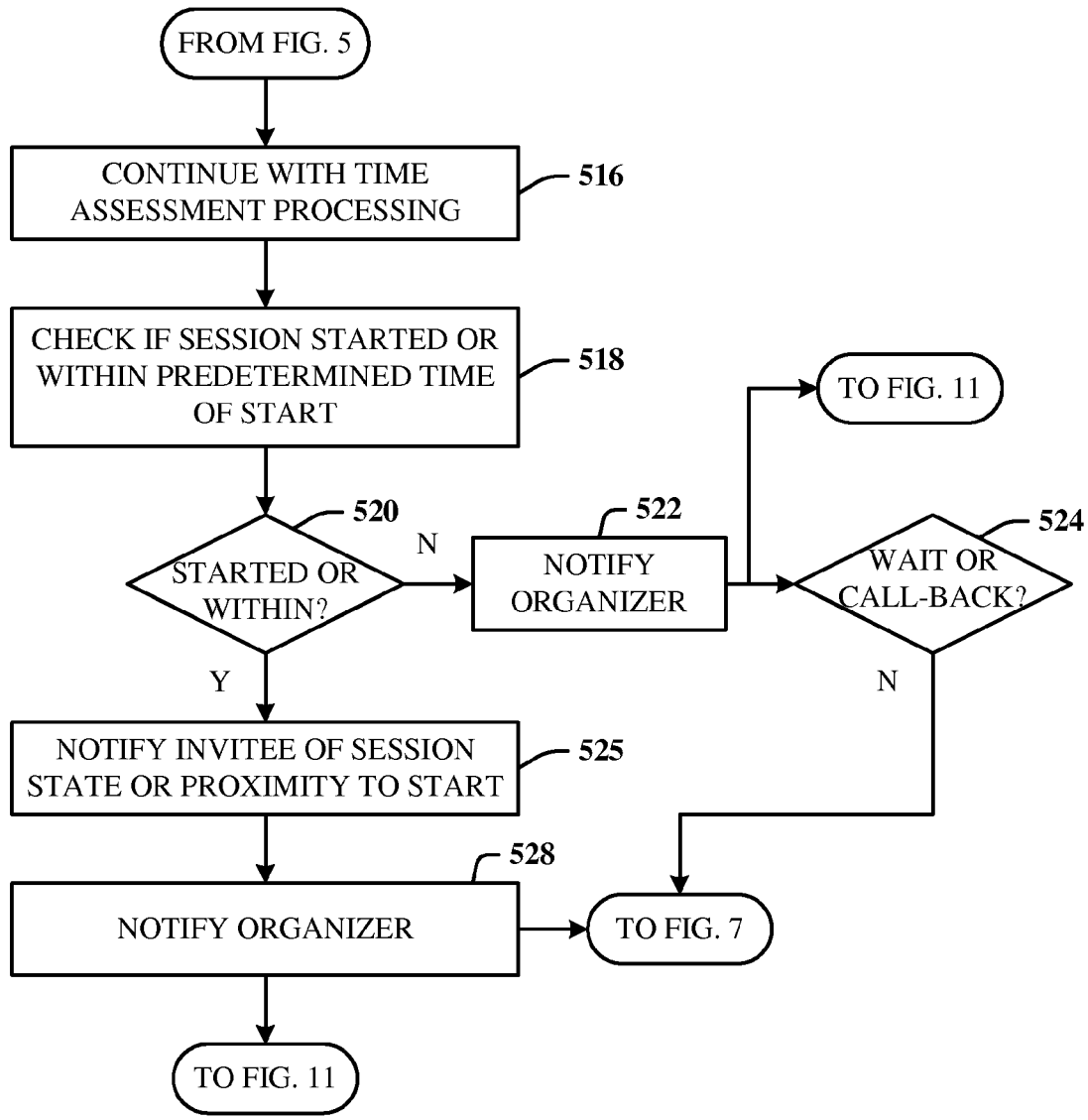
FIG. 6 illustrates a time assessment portion of the call conference user experience.
Figure 7:
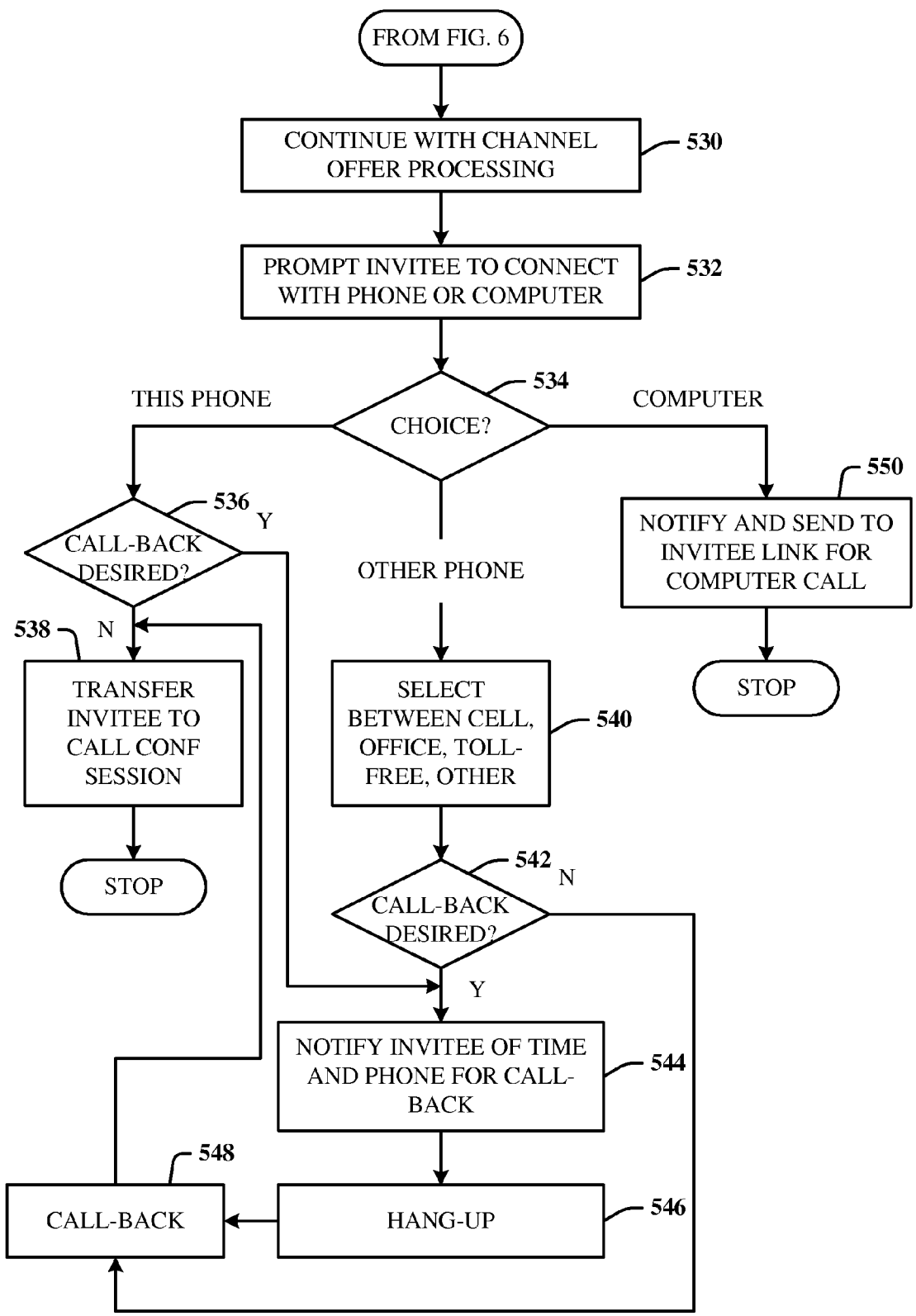
FIG. 7 illustrates channel processing flow for a conference call session.

FIG. 5, FIG. 6, and FIG. 7 are a single flow diagram for an example conference call method. FIG. 5 illustrates a method of inviting an invitee to a conference call session. At 500, the system determines how the invitee was reached. At 502, if reached by email, no further action is provided and the invitee is not connected. However, a richer user experience can include a URL (uniform resource locator) or similar type of string (e.g., URI (uniform resource identifier) for SIP access) in the email that facilitates connecting to the session. If the invitee was not reached via email, the invitee was reached via a phone or text messaging, as indicated at 504. At 506, the system then informs the invitee of the creation of a conference call session. At 508, a check is made to determine if a conference call session has been created.

If a conference call session already exists flow moves to time evaluation processing of FIG. 6. If a conference call session has not been created, flow is from 508 to 510 to check if a web conference session exists. If the web session exists, flow is from 510 to 512 where the audio connection is bridged to the web conference session and the invitee joins the audio channel of the web conference session. If neither the conference call session nor the web conference session has been created, flow is from 510 to 514 where the conference call session is created and associated with the web conference audio channel. At this time, the invitee can be informed that a web conference session exists and that the invitee is being joined into the session. Flow is then to time assessment in FIG. 6.

FIG. 6 illustrates a time assessment portion of the call conference user experience. At 516, the invitee-join functionality continues with time assessment processing. At 518, the system checks if the session has already started or if the time proximity before session start is within a predetermined time (e.g., five minutes) of session start. At 520, if the session has not started or the time before session start is greater than the predetermined time (e.g., five minutes), flow is to 522 where a notification is sent to the session organizer. Flow then continues to FIG. 11 to contact the organizer.

Alternatively, at this time, the invitee can be offered the option to receive a call-back, rather than wait, as indicated at 524. If not, then flow is to channel offer processing in FIG. 7. At 520, if the session has started or the time before session start is less than the predetermined time (e.g., five minutes), flow is to 526 where the invitee can be notified that the session has started or of the time to session start. At 528, the organizer is notified and flow is to FIG. 11 for the process of contacting the organizer. Additionally, flow is from 528 to channel offer processing in FIG. 7.

FIG. 7 illustrates channel processing flow for a conference call session. If the session has started or the time to session start is less than or equal to the predetermined time (e.g., within five minutes), flow moves to 530 to continue with the channel offer processing. Once the invitee has indicated the time preference, the invitee is prompted for the communication means for joining the session, for example, by computer (web conferencing), or by a phone (call conferencing). If the invitee selects the phone currently in use, flow is to 536 to check if a call-back is desired. A variant is that if the invitee is already on the phone, for example, the application language/logic can be changed to reflect "join on this phone." If not, the invitee is transferred to the conference call session, as indicated at 538.

If the invitee chooses a different phone to join the session, flow is from 534 to 540 to select between a cell phone, office phone, toll-free phone, or other. The act of selecting can include entering an identifier such as a phone number or a code that identifies the location where (e.g., a hotel) the invitee wishes to be called. At 542, a check is made for a call-back on this other phone. If so, at 544, the invitee is notified of the call-back. At 546, the connection terminates, and the call-back occurs at the appointed time, as indicated at 548. Flow is then to 538 where the invitee is joined into the conference call session. At 536, if the invitee desired a call-back in this phone, flow is to 544 to then process the call-back as just described.

At 534, if the connection mode is by computer, flow is to 550 to notify and send to the invitee a link to make the computer call. At selected places during this flow, the invitee can be receiving status update instructions as to how to proceed or make selections such as is associated with IVR technology.

Once the communication means has been identified, all the user-controllable parameters are completed and the invitee is connected to the session using the communications means the invitee selected, which may require a mode change in conjunction with the time the invitee selected.

Figure 8:
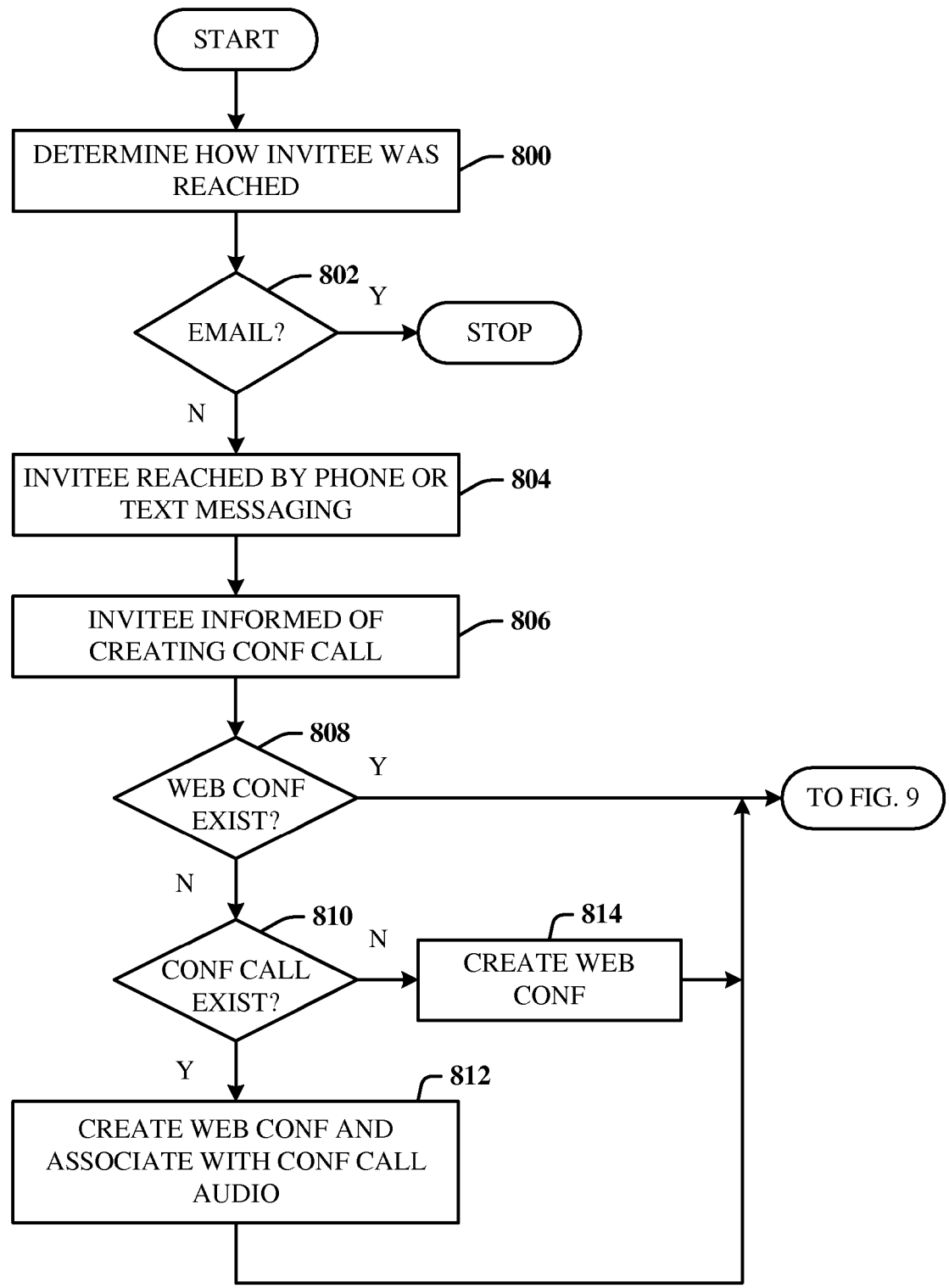
FIG. 8 illustrates a method of inviting an invitee to a web conference session.

FIG. 8 illustrates a method of inviting an invitee to a web conference session. If the invitee has chosen to join via a web conference call, the process is to first check if a conference call session or web conference session has been created. If a web conference does already exist, flow is to the time evaluation. If the web conference has not been created but a conference call session has been created, the audio connection is bridged and the invitee joins the audio channel of the conference call. If neither the web conference session nor the conference call session has been created for the meeting, the web conference session is created and flow is to the time assessment.

More specifically, at 800, the system determines how the invitee was reached. At 802, if reached by email, no further action is provided and the invitee is not connected. If the invitee was not reached via email, the invitee was reached via a phone or text messaging, as indicated at 804. At 806, the system then informs the invitee of the creation of a conference call session. At 808, a check is made to determine if a web conference session has been created. If the web conference session already exists flow moves to time evaluation processing in FIG. 9. If a web conference session has not been created, flow is from 808 to 810 to check if a conference call session exists. If the conference call session exists, flow is from 810 to 812 where the audio connection is bridged to the web conference session and the invitee joins the audio channel of the web conference session. If neither the conference call session nor the web conference session has been created, flow is from 810 to 814 where the conference call session is created and associated with the web conference audio channel. At this time, the invitee can be informed that a web conference session exists and that the invitee is being joined into the session. Flow is then to time assessment in FIG. 9.

Figure 9:
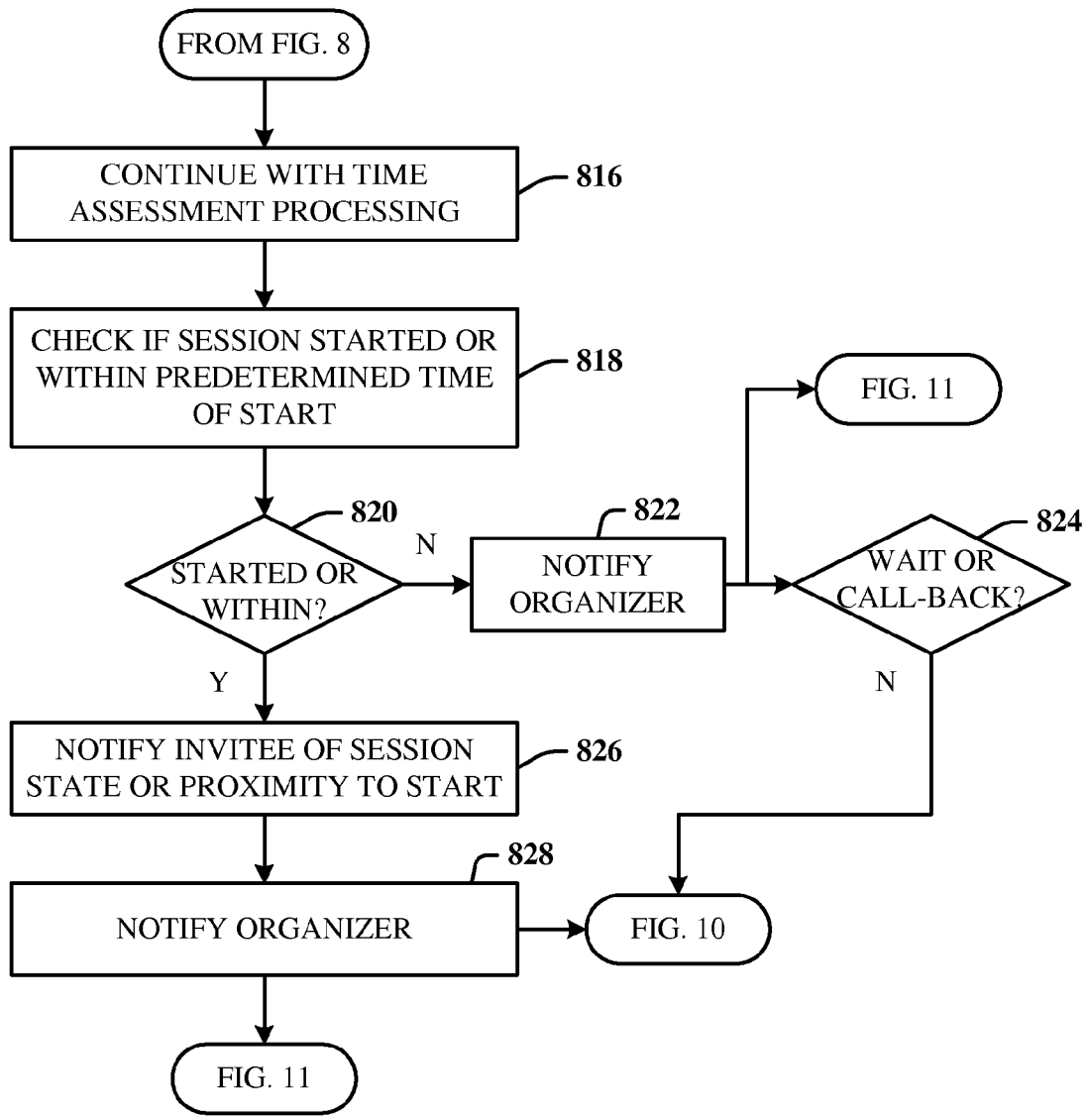
FIG. 9 illustrates a time assessment portion of the web conference user experience.

FIG. 9 illustrates a time assessment portion of the web conference user experience. At 816, the invitee-join functionality continues with time assessment processing. At 818, the system checks if the session has already started or if the time proximity before session start is within a predetermined time (e.g., five minutes) of session start. At 820, if the session has not started or the time before session start is greater than the predetermined time (e.g., five minutes), flow is to 822 where a notification is sent to the session organizer. Flow then continues to FIG. 11 to contact the organizer.

Alternatively, at this time, the invitee can be offered the option to receive a call-back, rather than wait, as indicated at 824. If not, then flow is to channel offer processing in FIG. 10. At 820, if the session has started or the time before session start is less than the predetermined time (e.g., five minutes), flow is to 826 where the invitee can be notified that the session has started or of the time to session start. At 828, the organizer is notified and flow is to FIG. 11 for the process of contacting the organizer. Additionally, flow moves from 828 to channel offer processing in FIG. 10.

Figure 10:
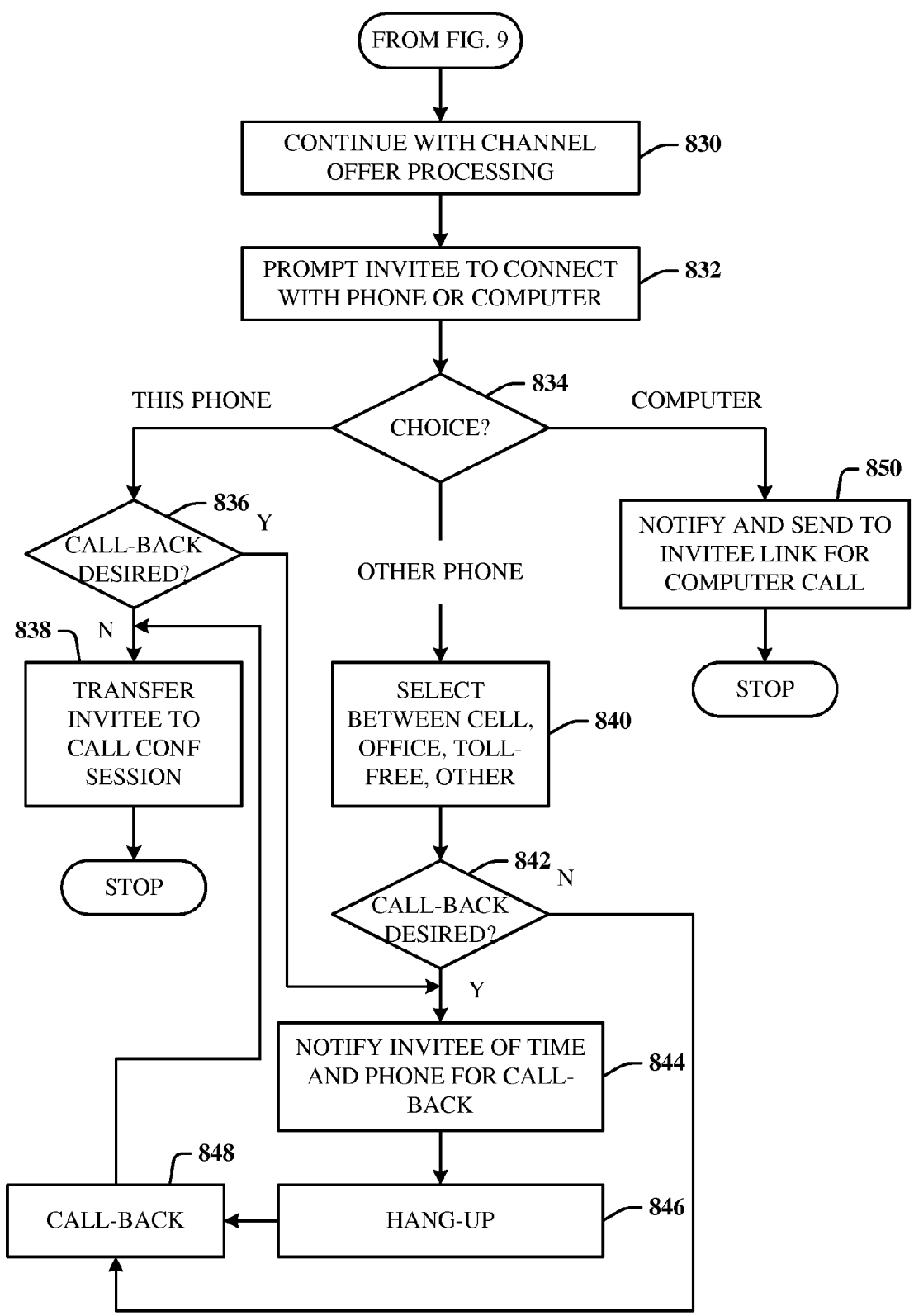
FIG. 10 illustrates channel processing flow for web conferencing.

FIG. 10 illustrates channel processing flow for web conferencing. If the session has started or the time to session start is less than or equal to the predetermined time (e.g., within five minutes), flow moves to 830 to continue with the channel offer processing. Once the invitee has indicated the time preference, the invitee is prompted for the communication means for joining the session, for example, by computer (web conferencing), or by a phone (call conferencing). If the invitee selects the phone currently in use, flow is to 836 to check if a call-back is desired. A variant is that if the invitee is already on the phone, for example, the application language/logic can be changed to reflect "join on this phone." If not, the invitee is transferred to the conference call session, as indicated at 838.

If the invitee chooses a different phone to join the session, flow is from 834 to 840 to select between a cell phone, office phone, toll-free phone, or other. At 842, a check is made for a call-back on this other phone. If so, at 844, the invitee is notified of the call-back. At 846, the connection terminates, and the call-back occurs at the appointed time, as indicated at 848. Flow is then to 838 where the invitee is joined into the conference call session. At 836, if the invitee desired a call-back in this phone, flow is to 844 to then process the call-back as just described.

At 834, if the connection mode is by computer, flow is to 850 to notify and send to the invitee a link to make the computer call. At selected places during this flow, the invitee can be receiving status update instructions as to how to proceed or make selections such as is associated with IVR technology. Once the communication means has been identified, all the user-controllable parameters are completed and the invitee is connected to the session using the communications means the invitee selected, which may require a mode change in conjunction with the time the invitee selected.

Figure 11:
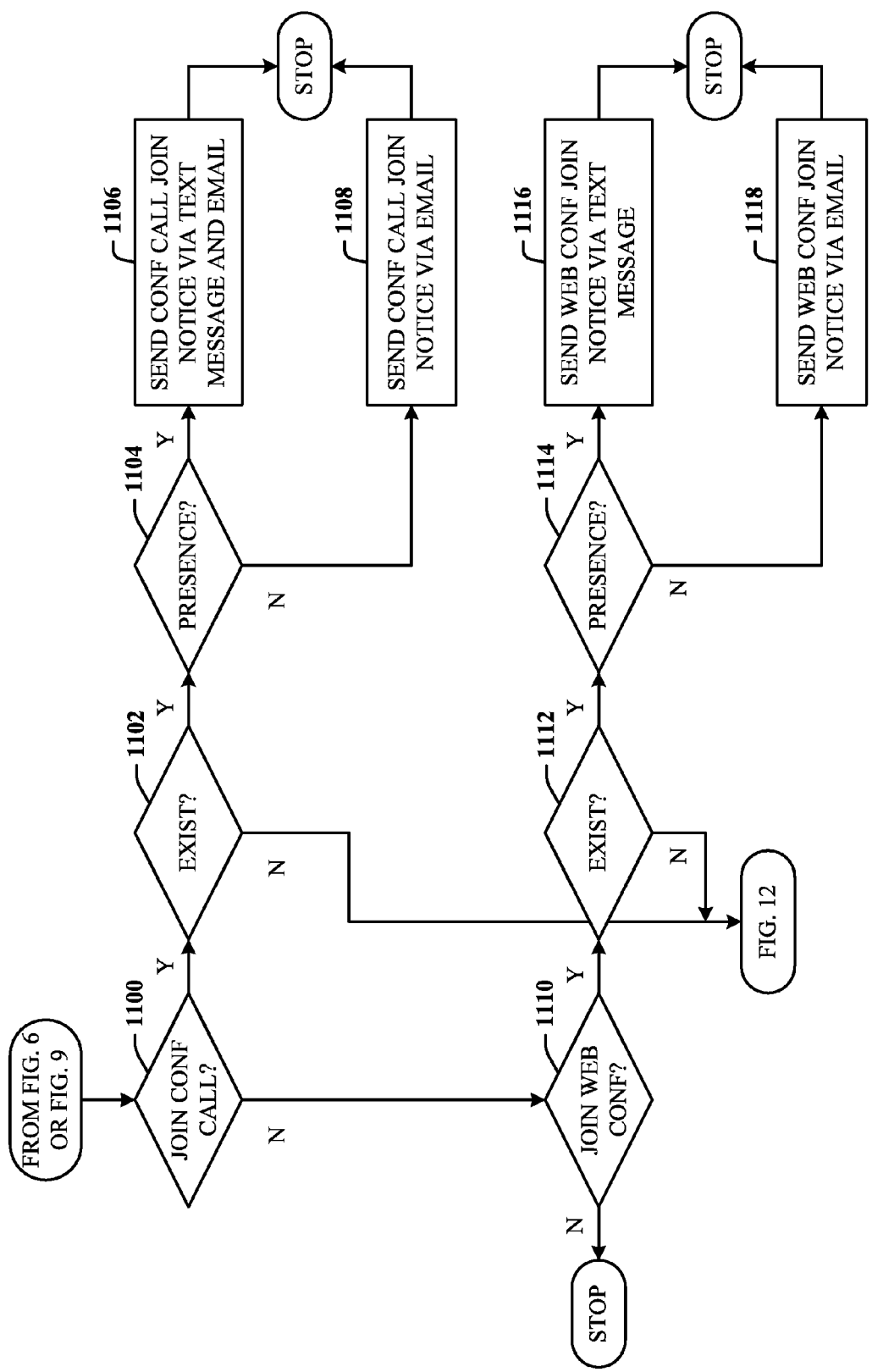
FIG. 11 illustrates method flow related to resource checking.
Figure 12:
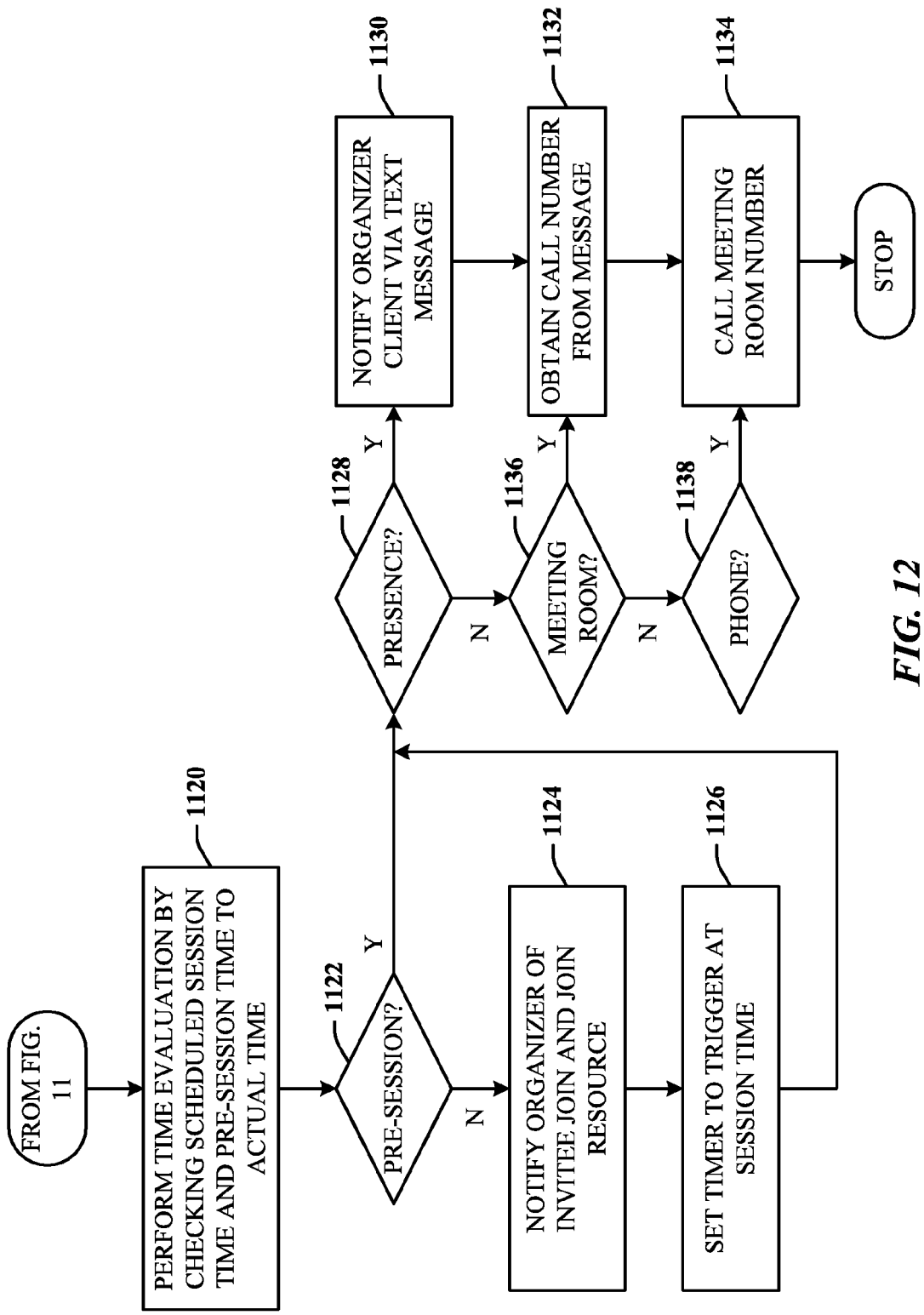
FIG. 12 illustrates a method for time evaluation processing related to the organizer.

FIG. 11 and FIG. 12 illustrate a method of processing actions associated with a session organizer. FIG. 11 shows method flow related to resource checking. If an invitee chooses to join the session the following can occur. If the resource (web conference session or conference call session) has already been created, the meeting organizer can be notified by a text message, if presence information shows that the organizer is available, or by email. If a new meeting resource has been created then the organizer is contacted via a text message, email and calling the meeting to notify the organizer of the creation, and then automatically join the organizer into the newly created resource More specifically, at 1100, a check is made to determine if the invitee is choosing to join a conference call session. If so, at 1102, if the conference call session exists, the presence information for the organizer is checked, at 1104. If the presence information indicates available or as in-meeting, at 1106, the organizer is notified of the join of the invitee to the conference call session. The notification to the organizer can be by text message. If the presence information indicates the organizer is unreachable, flow is from 1104 to 1108 where the notification to the organizer can be sent by email.

If the invitee is not choosing to join a conference call session, flow is from 1100 to 1110 to check if the invitee is choosing to join a web conference session. If not, the process stops. If so, flow is from 1110 to 1112 to check if the web conference session exists. If so, flow is to 1114 to check for presence information related to the session organizer. If the presence information indicates available or as in-meeting, at 1114, the organizer is notified of the join of the invitee to the web conference session. The notification to the organizer can be by text message and email. If the presence information indicates the organizer is unreachable, flow is from 1114 to 1118 where the notification to the session organizer can be by email.

If neither the conference call session nor the web conference session exists, time evaluation processing is performed. FIG. 12 shows a method for time evaluation processing related to the organizer. At 1120, time evaluation is performed by checking the scheduled session time and pre-session time to the actual time. At 1122, if the time indicates greater than the pre-session time (or predetermined value just prior to the scheduled session time), flow is to 1124 to notify the organizer of the invitee join and join resource (e.g., web conference session or conference call session). The notification can be by email indicating that the invitee will be joining via web conference or conference call, and a reminder text message at the meeting time. At 1126, a timer is set to trigger at session time.

Flow is then to 1128 to check for presence information (e.g., in-meeting or available) of the organizer. Additionally, at 1122, if the time is in the pre-session time or the session has actually started, flow is also to 1128 to check for organizer presence information. If the organizer is available, flow is from 1128 to 1130 to notify the organizer of the identity of the invitee joining either the web conference to the conference call session. The organizer is then offered options for connecting to the session such as via phone, for example, and a link (e.g., session initiation protocol (SIP)) connecting to the web conference session. At 1132, the call number is obtained from the link information. At 1134, the call number is used to call the meeting room. The organizer can then accept the call request.

If there is no presence information or if the organizer is unavailable, flow is from 1128 to 1136 to check for the meeting room number in the invitation. If there is a meeting room, flow is to 1132 to obtain the call number form the message. Flow then continues to 1134, as before. If no meeting room information was in the invitation, flow is to 1138 to check for a phone number for the meeting room. If available, flow is to 1134 to call the meeting room number and notify the organizer of the invitee identity to join the web conference or conference call session.

It is to be understood that not all of the functionality described herein is required to obtain the benefits of the join architecture. For example, time processing and/or alternative contact points can be omitted with no functional impact on the core capability of the join architecture other than providing a less rich user experience.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 13:
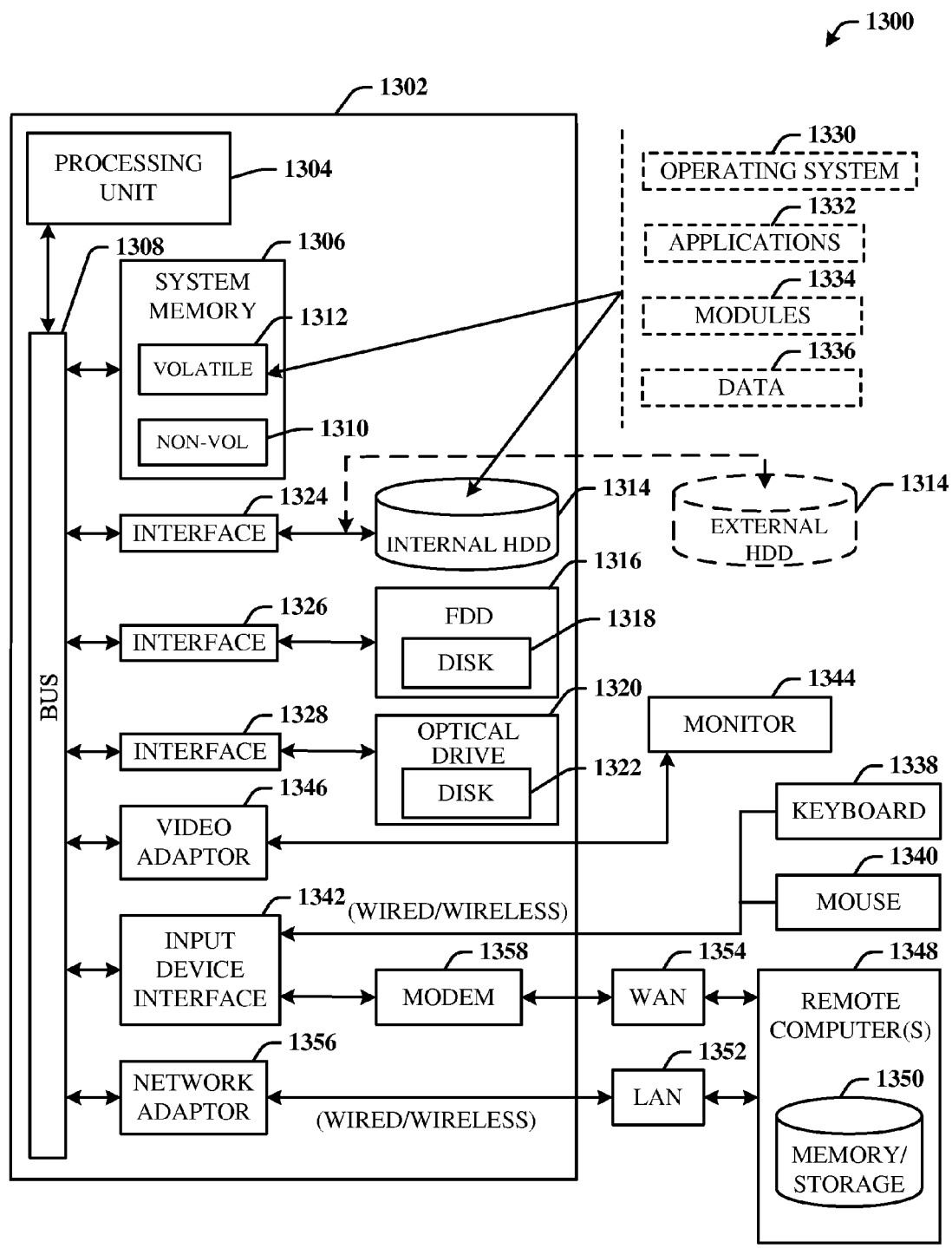
FIG. 13 illustrates a block diagram of a computing system operable to execute invitee-join in accordance with the disclosed architecture.

Referring now to FIG. 13, there is illustrated a block diagram of a computing system 1300 operable to execute invitee-join in accordance with the disclosed architecture. In order to provide additional context for various aspects thereof, FIG. 13 and the following discussion are intended to provide a brief, general description of a suitable computing system 1300 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 13, the exemplary computing system 1300 for implementing various aspects includes a computer 1302 having a processing unit 1304, a system memory 1306 and a system bus 1308. The system bus 1308 provides an interface for system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 can include non-volatile memory (NON-VOL) 1310 and/or volatile memory 1312 (e.g., random access memory (RAM)). A basic input/output system (BIOS) can be stored in the non-volatile memory 1310 (e.g., ROM, EPROM, EEPROM, etc.), which BIOS stores the basic routines that help to transfer information between elements within the computer 1302, such as during start-up. The volatile memory 1312 can also include a high-speed RAM such as static RAM for caching data.

The computer 1302 further includes an internal hard disk drive (HDD) 1314 (e.g., EIDE, SATA), which internal HDD 1314 may also be configured for external use in a suitable chassis, a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as a DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1312, including an operating system 1330, one or more application programs 1332, other program modules 1334, and program data 1336. The one or more application programs 1332, other program modules 1334, and program data 1336 can include the invite component 102, join component 108, session 106, and client application 214. The system 1300 can be the client system 202. The system 1300 can also operate as the conferencing server system 218.

All or portions of the operating system, applications, modules, and/or data can also be cached in the volatile memory 1312. It is to be appreciated that the disclosed architecture can be implemented with various commercially available operating systems or combinations of operating systems.

A user can enter commands and information into the computer 1302 through one or more wire/wireless input devices, for example, a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, etc.

A monitor 1344 or other type of display device is also connected to the system bus 1308 via an interface, such as a video adaptor 1346. In addition to the monitor 1344, a computer typically includes other peripheral output devices (not shown), such as speakers, printers, etc.

The computer 1302 may operate in a networked environment using logical connections via wire and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, is connected to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

As previously indicated, the disclosed architecture also applies to mobile devices having some level of computing capability such that a client application can be installed to facilitate the join functionality described herein.

Figure 14:
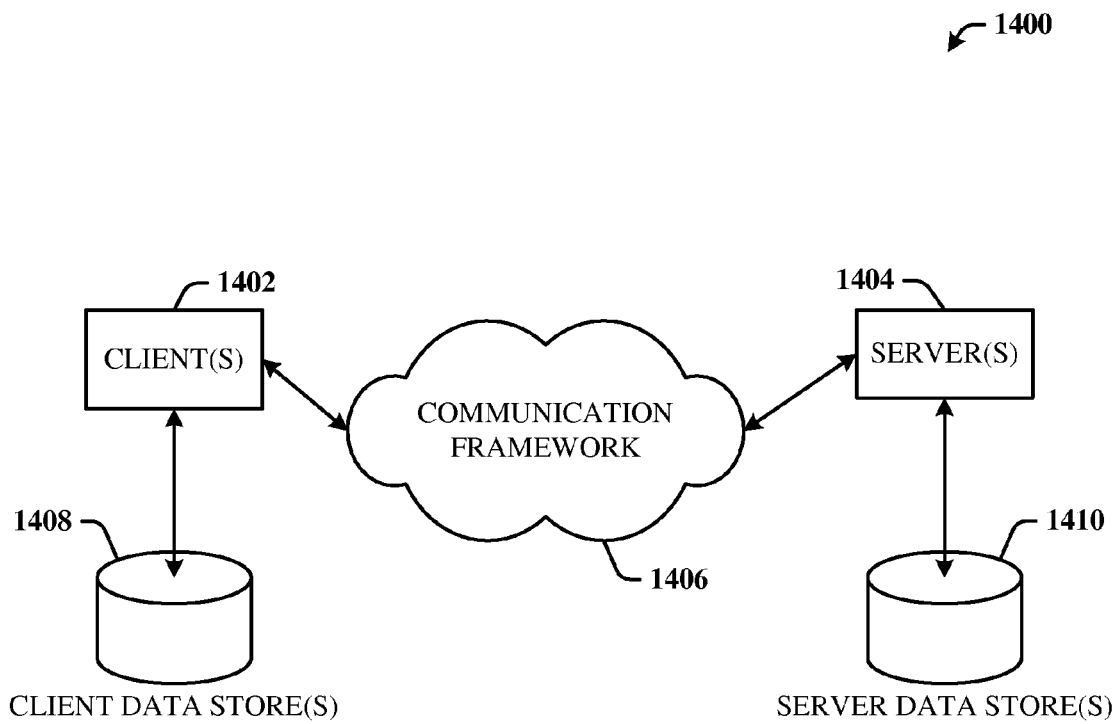
FIG. 14 illustrates a schematic block diagram of an exemplary client-server computing environment that facilitates invitee-join functionality.

Referring now to FIG. 14, there is illustrated a schematic block diagram of an exemplary client-server computing environment 1400 that facilitates invitee-join functionality. The environment 1400 includes one or more client(s) 1402. The client(s) 1402 can be hardware and/or software (e.g., threads, processes, computing devices). The client(s) 1402 can house cookie(s) and/or associated contextual information, for example.

The environment 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The environment 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404. The client(s) 1402 can include the client system 202, and the server(s) 1404 can include the server system 218.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented communications system, comprising:
    an invite component for receiving an invitation for an invitee to participate in a communications session;
    a join component for checking to determine if the communications session has been created, and if so, automatically joining the invitee into the communications session in response to the invitation; and
    a microprocessor that executes computer-executable instructions associated with at least one of the invite component or the join component.

2. The system of claim 1, wherein the join component determines that the communications session has been created prior to the invitation and automatically joins the invitee using a communications mode associated with the session.

3. The system of claim 1, wherein the join component determines that the communication session has not been created and automatically creates the communications session and joins the invitee upon receiving a response to the invitation, and other invitees join the communications session using a communications mode associated with the session.

4. The system of claim 3, wherein the other invitees are notified of the communications session prior to joining the communications session.

5. The system of claim 1, wherein the communications session is a conference call that is associated with voice communications or a web conference that is associated with video conferencing.

6. The system of claim 5, wherein the invitee receives the invitation to the communications session via a communications mode that includes text messaging, voice phone call, email, short message service (SMS), or multimedia message service (MMS), and connects to the session according to an associated conferencing method.

7. A computer-implemented communications system, comprising:
    an invite component for receiving an invitation for an invitee to participate in a conferencing session, the invitation received via one or more communications modes that include text messaging, interactive voice call, email, SMS, or MMS;
    a join component for detecting whether the conferencing session exists and if so, automatically joining the invitee into the conferencing session in response to the invitation, the invitee joined using a conferencing method that corresponds to the conferencing session; and
    a microprocessor that executes computer-executable instructions associated with at least one of the invite component or the join component.

8. The system of claim 7, wherein the join component automatically creates the conferencing session for the invitee if the session is not detected as being already established.

9. The system of claim 7, wherein the join component mixes audio and video of the conferencing session.

10. The system of claim 7, wherein the conferencing session is a conference call session or a web conference session.

11. The system of claim 7, wherein the invite component facilitates interactive dialog with the invitee.

12. The system of claim 7, wherein the invite component invites a session organizer into the session, and the join component joins the organizer into the session.

13. A computer-implemented method of managing a communications session, performed by a computer system executing machine-readable instructions, the method comprising acts of
    receiving an invitation to participate in a conferencing session over multiple disparate communications modes;
    checking whether state of the conferencing session is indicated as existent; and
    automatically joining an invitee into the conferencing session in response to the invitation if the state indicates that the conferencing session exists.

14. The method of claim 13, further comprising connecting the invitee to the session based on an invitee-selected communications mode.

15. The method of claim 13, further comprising automatically creating the conferencing session if the state indicates that the conferencing session is nonexistent.

16. The method of claim 13, further comprising notifying a session organizer of a created session.

17. The method of claim 13, further comprising initiating a call-back to the invitee or a session organizer when the session is established.

18. The method of claim 13, further comprising sending a web conference link to a web conferencing session as part of the invitation.

19. The method of claim 13, further comprising checking for presence information related to a session organizer and notifying the organizer of an existing session based on the presence information.

20. The method of claim 13, further comprising sending a request to access the session by the invitee.

* * * * *